United States Patent [19]

Hatamura et al.

[11] Patent Number: 4,630,575

[45] Date of Patent: Dec. 23, 1986

[54] INTAKE SYSTEM FOR MULTICYLINDER ENGINE

[75] Inventors: Koichi Hatamura; Tetsuo Hiraoka, both of Hiroshima, Japan

[73] Assignee: Mazda Motor Corporation, Hiroshima, Japan

[21] Appl. No.: 768,343

[22] Filed: Aug. 22, 1985

[30] Foreign Application Priority Data

Aug. 27, 1984 [JP] Japan .................................. 59-177791
Jan. 14, 1985 [JP] Japan .................................... 60-4670

[51] Int. Cl.$^4$ ............................................. F02B 27/02
[52] U.S. Cl. ........................... 123/52 M; 123/52 MB; 123/339; 123/520; 123/568; 123/572
[58] Field of Search ............... 123/52 M, 52 MB, 518, 123/519, 520, 521, 339, 572, 573, 574, 568

[56] References Cited

U.S. PATENT DOCUMENTS

| 3,664,316 | 5/1972 | Garcea ........................... 123/52 MB |
| 4,300,488 | 11/1981 | Cser ................................ 123/52 MB |
| 4,494,493 | 1/1985 | Morikawa et al. ............... 123/52 M |
| 4,517,951 | 5/1985 | Otaka et al. ........................ 123/573 |

FOREIGN PATENT DOCUMENTS 173520 10/1984 Japan .............................. 123/52 MB Primary Examiner—Ira S. Lazarus
Attorney, Agent, or Firm—Gerald J. Ferguson, Jr.; Michael P. Hoffman; Ronni S. Malamud

[57] ABSTRACT

In an intake system for a multicylinder engine, discrete intake passage portions immediately connected to the respective cylinders are divided into two groups so that intake timings of the discrete intake passage portions in each group are not immediately successive, and the discrete intake passage portions in each group are concentrated to form a concentrated portion. Branch intake passage portions extend upstream from the concentrated portions for the both groups and are integrated with each other to form a main intake passage portion. Bypass air for adjusting the engine rpm during idling, blowby gas from the crankcase, fuel vapors trapped by the canister, exhaust from the exhaust system and the like are introduced into the concentrated portions of the discrete intake passage portions or the branch intake passage portions by way of a fluid introduction passage comprising a pair of branch introduction passage portions which are connected to the respective concentrated portions at one end and to a downstream end of a main introduction passage portion at the other end. The main introduction passage portion is connected to sources of the fluids described above at the upstream end portion. The average length l and the diameter d of the branch introduction passage portions are selected to satisfy the condition $$d/\sqrt{l} < D/\sqrt{L},$$

wherein D and L respectively represent the diameter and the average length of the branch intake passage portions. Flow control valves for controlling the amount of the fluids described above to be introduced into the branch intake passage portions or the concentrated portions are provided in the fluid introduction passage upstream of the junction of the branch introduction passage portions to the main introduction passage portion.

17 Claims, 4 Drawing Figures

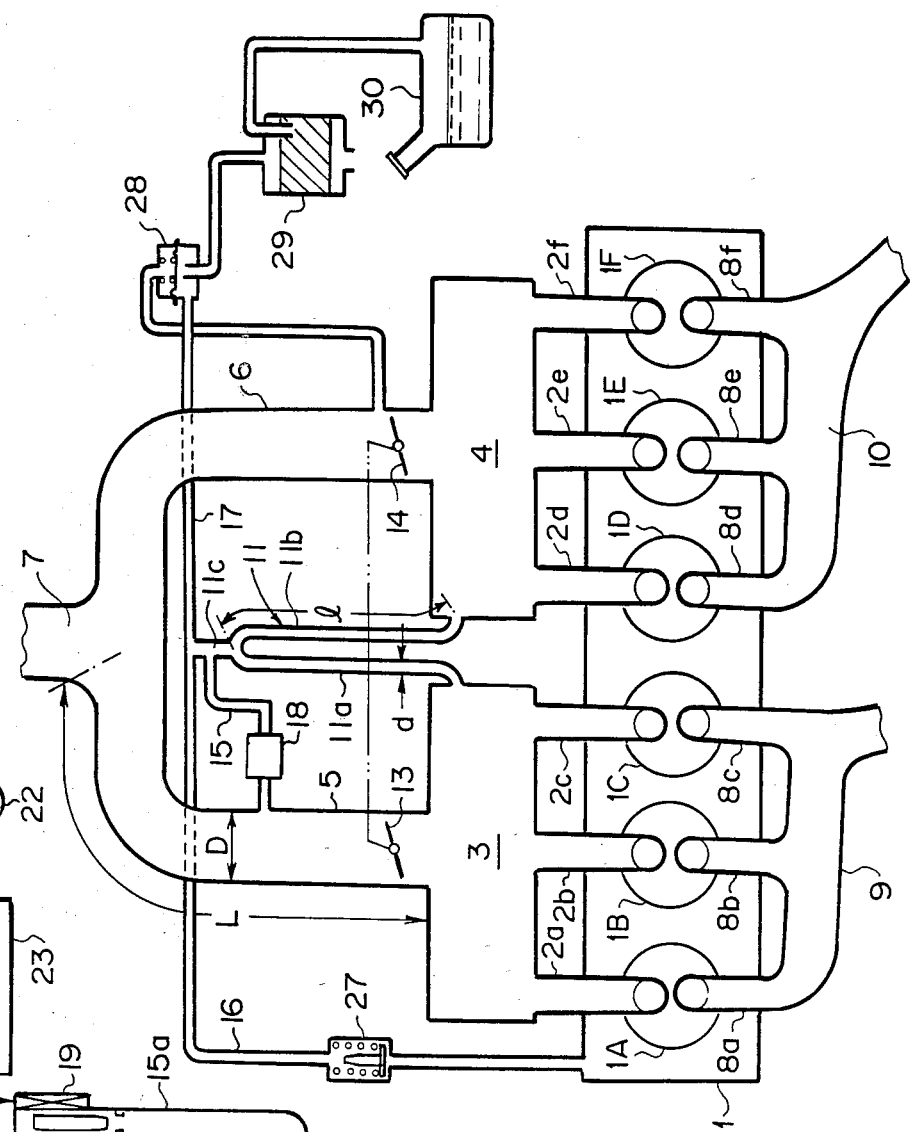
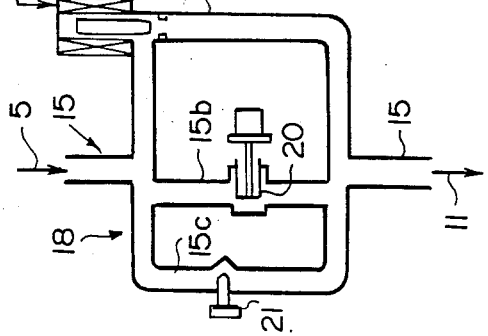

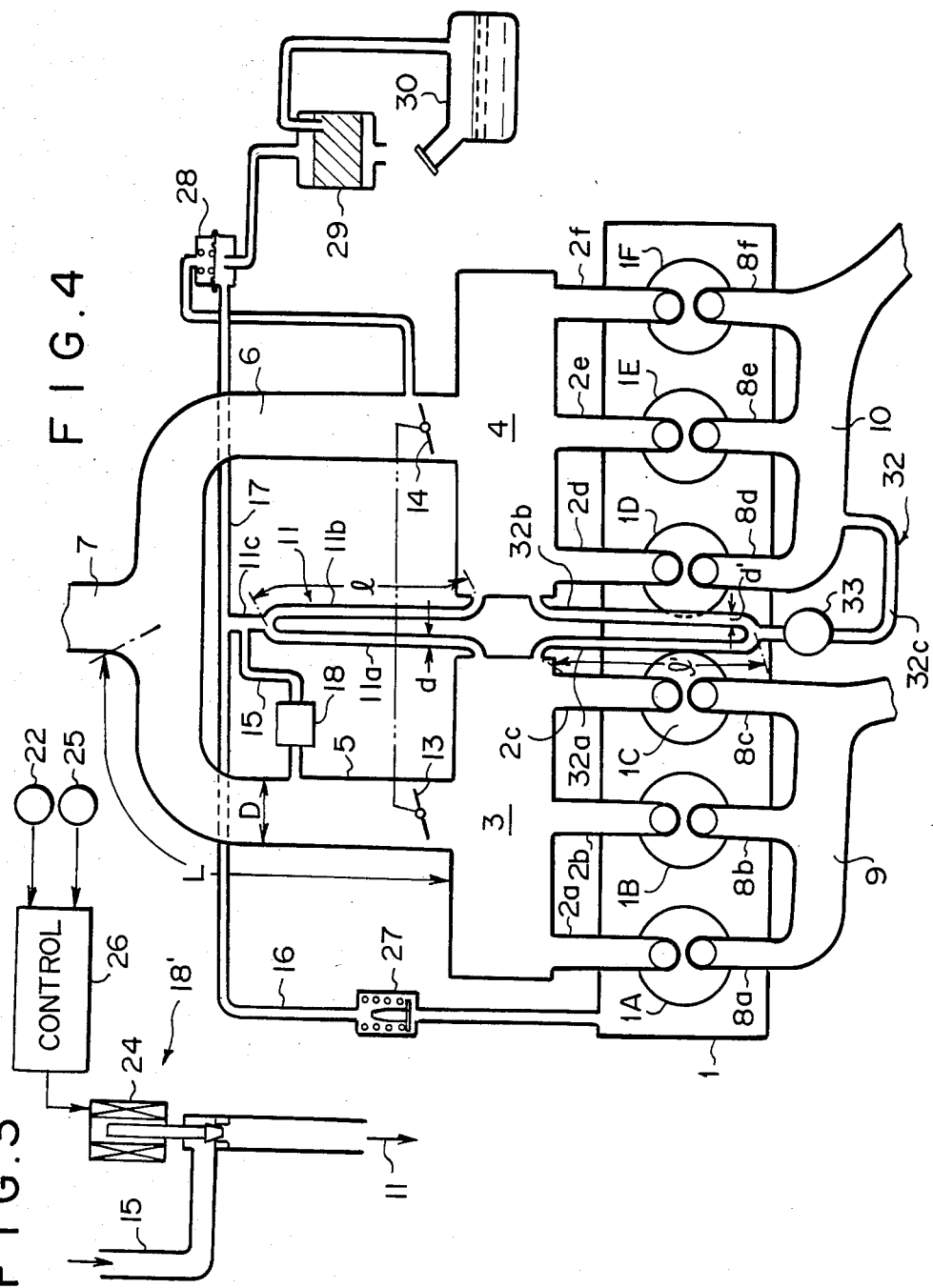

INTAKE SYSTEM FOR MULTICYLINDER ENGINE

BACKGROUND OF THE INVENTION

1. Field of the Invention

This invention relates to an intake system for a multicylinder engine.

2. Description of the Prior Art

As disclosed in Japanese Unexamined Patent Publications Nos. 56(1981)-115818 and 57(1982)-51910, there has been proposed an intake system for a multicylinder engine in which discrete intake passage portions immediately connected to the respective cylinders are divided into two groups so that intake timings of the discrete intake passage portions (intake timings of the cylinders to which the discrete intake passage portions are respectively connected) in each group are not immediately successive, and the discrete intake passage portions in each group are concentrated to form a concentrated portion, branch intake passage portions extending upstream from the concentrated portions for the both groups and being integrated with each other to form a main intake passage portion. In the intake system, a supercharging effect can be obtained by virtue of periodical pressure vibration produced by the air column vibration system in the intake passage upstream of the concentrated portions (this supercharging effect will hereinbelow be referred to as "resonant supercharging effect"), and by concentrating the discrete intake passage portions whose intake timings are not immediately successive into each concentrated portion, intake air interference can be prevented.

When bypass air for adjusting the engine rpm during idling, blowby gas from the crankcase, fuel vapors trapped by the canister, or exhaust from the exhaust system is to be introduced into the intake passage in the intake system described above, such air or gas should be introduced into the concentrated portions or the portions between the respective concentrated portions and the junction of the branch intake passage portions extending upstream from the concentrated portions in order to evenly distribute the air or gas to all the cylinders. With respect to response to operation of the accelerator, it is preferred that a throttle valve be provided in each branch intake passage portion near the concentrated portion. In this case, said air or gas should be introduced into the concentrated portions or into the branch intake passage portions downstream of the throttle valves.

There arises a problem that when an introduction passage for introducing the air or gas into the intake passage is simply connected to each concentrated portion or branch intake passage portion, the concentrated portions are communicated with each other by way of the introduction passages and resonant supercharging effect can be adversely affected.

That is, the frequencies at which the pressure vibration in the concentrated portions is in tune with the vibration of the air column in the branch intake passage portions are in proportion to $D/\sqrt{L}$, wherein L represents the average length of the branch intake passage portions between the respective concentrated portions and the junction of the branch intake passage portions and D represents the average diameters of the branch intake passage portions. Generally, an optimal torque increasing effect from the resonant supercharging can be obtained when the engine operates at low-to-medium speeds. When the concentrated portions are communicated by short introduction passages in an intake system which has been arranged so that the vibration of the air column in the portion of the intake passage upstream of the concentrated portions is in tune with the periodical pressure vibration in the concentrated portions in the low-to-medium engine speed range, the engine speed at which the two vibrations are attuned with each other becomes higher and, accordingly, the torque increasing effect of the resonant supercharging effect cannot be sufficiently enjoyed at the desired engine speed range.

SUMMARY OF THE INVENTION

In view of the foregoing observations and description, the primary object of the present invention is to provide an intake system of the type described above in which bypass air for adjusting the engine rpm during idling, blowby gas from the crankcase, fuel vapors trapped by the canister, exhaust from the exhaust system and the like can be introduced into the concentrated portions of the discrete intake passage portions without adversely affecting the resonant supercharging effect.

In accordance with the present invention, bypass air for adjusting the engine rpm during idling, blowby gas from the crankcase, fuel vapors trapped by the canister, exhaust from the exhaust system and the like are introduced into the concentrated portions of the discrete intake passage portions or the branch intake passage portions by way of a fluid introduction passage comprising a pair of branch introduction passage portions which are connected to the respective concentrated portions at one end and to a downstream end of a main introduction passage portion at the other end. The main introduction passage portion is connected to sources of the fluids described above at the upstream end portion. The average length l and the diameter d of the branch introduction passage portions are selected to satisfy the condition $$d/\sqrt{l} < D/\sqrt{L},$$

wherein D and L respectively represent the diameter and the average length of the branch intake passage portions. Flow control valves for controlling the amount of the fluids described above to be introduced into the branch intake passage portions or the concentrated portions are provided in the fluid introduction passage upstream of the junction of the branch introduction passage portions to the main introduction passage portion.

BRIEF DESCRIPTION OF THE DRAWINGS

FIG. 1 is a schematic view showing a gasoline-fueled engine having an intake system in accordance with a first embodiment of the present invention, FIG. 2 is a schematic view showing an example of a flow control mechanism of the bypass air introduction passage employed in the first embodiment, FIG. 3 is a schematic view showing another example of the flow control mechanism, and FIG. 4 is a view similar to FIG. 1 but showing another embodiment of the present invention.

DESCRIPTION OF THE PREFERRED EMBODIMENT

FIG. 1 schematically shows a six-cylinder, in-line engine having an intake system in accordance with a first embodiment of the present invention.

The six-cylinder, in-line engine 1 has first to sixth cylinders 1A to 1F the firing order of which is 1-4-2-5-3-6. That is, the cylinders fire in the order of 1A-1D-1B-1E-1C-1F. The cylinders 1A to 1F are provided with intake air through an intake passage comprising discrete intake passages 2a to 2f directly connected to the respective cylinders, first and second surge tanks 3 and 4, a pair of branch intake passage portions 5 and 6, and a main intake passage portion 7 (upstream end of the main intake passage portion 7 is not shown in FIG. 1). The discrete intake passage portions 2a to 2c for the first to third cylinders 1A to 1C are connected to the first surge tank (concentrated portion of the discrete intake passage portions) 3 and the discrete intake passage portions 2d to 2f for the fourth to sixth cylinders 1D to 1F are connected to the second surge tank. As can be understood from the firing order 1-4-2-5-3-6, intake timings of the discrete intake passage portions (intake timings of the cylinders to which the discrete intake passage portions are respectively connected) connected to each surge tank do not essentially overlap with each other. The branch intake passage portions 5 and 6 extend upstream respectively from the first and second surge tanks 3 and 4 and are integrated to form the main intake passage portion 7. In downstream portions of the branch intake passage portions 5 and 6 are disposed throttle valves 13 and 14 which are opened and closed in synchronization with each other. Discrete exhaust passage portions 8a to 8c for the first to third cylinders 1A to 1C are connected to a first exhaust pipe 9 and discrete exhaust passage portions 8d to 8f for the fourth to sixth cylinders 1D to 1F are connected to a second exhaust pipe 10.

A fluid introduction passage 11 for introducing bypass air for adjusting the engine rpm during idling, blowby gas from the crankcase, and fuel vapors trapped by the canister into the first and second surge tank 3 and 4 comprises first and second branch introduction passage portions 11a and 11b respectively connected to the first and second surge tanks 3 and 4 at one end, and a main introduction passage portion 11c which the first and second branch introduction passage portions 11a and 11b are connected at the other end. To the main introduction passage portion 11c of the fluid introduction passage 11 are connected one end of a bypass air introduction passage 15 which is connected to the branch intake passage 5 upstream of the throttle valve 13 at the other end, one end of a blowby gas introduction passage 16 which is connected to the crankcase (not clearly shown) at the other end, and one end of a fuel vapor introduction passage 17 which is connected to a canister 29.

The bypass air introduction passage 15 is provided with a flow control mechanism 18 at an intermediate portion for controlling the amount of bypass air. FIG. 2 shows an example of the flow control mechanism 18. In FIG. 2, the bypass air introduction passage 15 is trifurcated at an intermediate portion into first to third passages 15a to 15c. A SIG valve 19 for keeping constant the idling speed, a cold-time increasing valve 20 for increasing the amount of bypass air when the engine is cold, and a starting-time flow control valve 21 are respectively disposed in the first to third passages 15a to 15c.

The SIG valve 19 comprises a solenoid valve and is controlled in its opening degree by a control signal from a SIG control circuit 23 which receives an idling speed signal from a rpm sensor 22. The SIG valve 19 reduces the amount of the bypass air to lower the engine rpm when the idling speed is higher than a preset value while increasing the same to increase the engine rpm when the idling speed is lower than the preset value, thereby controlling the idling speed to the preset value. The cold-time increasing valve 20 comprises a thermovalve which closes or opens according to the temperature of the engine coolant. The cold-time increasing valve 20 opens to increase the amount of the bypass air when the temperature of the engine coolant is cold, thereby maintaining stability of the engine, and closes when the temperature of the engine coolant exceeds a preset value. When the cold-time increasing valve 20 is opened, the SIG valve 19 is closed. The starting-time flow control valve 21 comprises an adjustment screw for adjusting the fundamental amount of air in order to compensate for manufacturing errors and the like.

FIG. 3 shows another example of the flow control mechanism. The flow control mechanism 18' of this example comprises a solenoid valve 24 which is disposed in the bypass air introduction passage 15 and controls the opening degree of the bypass air introduction passage 15 under the control of a control unit 26 which delivers a control signal according to outputs of a rpm sensor 22 and an engine coolant temperature sensor 25.

The blowby gas introduction passage 16 is provided with a blowby gas control valve 27 which operates according to the intake vacuum in the surge tanks 3 and 4 to close the passage 16 when the engine load is high or low and open the same to permit introduction of blowby gas when the engine load is medium.

The fuel vapor introduction passage 17 is connected to a canister 29 by way of a control valve 28. As is well known, the canister 29 traps fuel vapor from a fuel tank 30 to prevent air pollution. The control valve 28 comprises a diaphragm valve which is displaced according to the intake vacuum in the intake passage 6 immediately upstream of the throttle valve 14 and opens when the throttle valve 14 is opened and the intake vacuum is imparted thereto, thereby introducing trapped fuel vapor into the surge tanks 3 and 4 through the fuel vapor introduction passage 17.

Generally, each of the intake valves for the first to sixth cylinders 1A to 1F open 240 degrees and the cylinders 1A to 1F fire at an interval of 120 degrees. Accordingly, the first and second surge tanks 3 and 4 alternately experience intake strokes of 240 degrees at an interval of 120 degrees, and none of the surge tanks simultaneously experiences the intake strokes of two cylinders. Further, each surge tank continuously experiences periodical pressure vibration and the pressure vibrations in the first and second surge tanks 3 and 4 differ in phase from each other by 120 degrees. Therefore, when the pressure in the first surge tank is maximum, the pressure in the second surge tank is minimum, and vice versa, whereby the pressure vibrations in the surge tanks 3 and 4 enhance each other at the branch intake passages 5 and 6. When an air column vibration system upstream of the surge tanks 3 and 4 resonates with the pressure vibration in each surge tank, an excellent resonant supercharging effect can be obtained. The resonant point of the pressure vibration of the air column vibration system upstream of the surge tanks 3 and 4, or the tuned engine speed at which the pressure vibration of the air column vibration system upstream of the surge tanks 3 and 4 resonates with the pressure vibration in each surge tank, is in proportion to $D/\sqrt{L}$ wherein L represents the average length of the branch intake passage portions 5 and 6 between the junction thereof and the surge tank 3 or 4, and D represents the diameter of the branch intake passage portions 5 and 6. Accordingly, the engine speed is tuned to a low-to-medium speed range in accordance with the requirements of the engine characteristics taking into account the fact that an optimal torque increasing effect due to the resonant supercharging can be obtained when the engine operates at low-to-medium speed.

The branch introduction passage portions 11a and 11b also communicate the first and second surge tanks 3 and 4, and resonance occurs also at a tuned engine speed proportional to $d/\sqrt{l}$ wherein l represents the average length of the branch introduction passage portions 11a and 11b between the junction thereof and the surge tanks 3 or 4, and d represents the diameter of the branch introduction passage portions 11a and 11b. The tuned engine speed at which the air column in the branch introduction passage portions 11a and 11b resonates with the pressure vibration in the surge tanks 3 and 4 (this tuned engine speed will hereinbelow be referred to as "introduction-passage-related tuned engine speed") is set lower than the tuned engine speed at which the air column vibration system upstream of the surge tanks 3 and 4 resonates with the pressure vibration in the surge tanks 3 and 4 (this tuned engine speed will hereinbelow be referred to as "intake-passage-related tuned engine speed"). In other words, the average length l and the diameter d of the branch introduction passage portions 11a and 11b are selected to satisfy condition $d/\sqrt{l}<D/\sqrt{L}$.

If the introduction-passage-related tuned engine speed is higher than the intake-passage-related tuned engine speed, the pressure vibration in the surge tanks 3 and 4 when the pressure vibration of the air column vibration system upstream of the surge tanks 3 and 4 resonates therewith at the corresponding tuned engine speed is attenuated through the branch introduction passage portions 11a and 11b, thereby adversely affecting the resonance supercharging effect. That is, in the resonance of the resonance systems mutually connecting the surge tanks 3 and 4, resonance occurring at a higher engine speed is governing. This is the reason why the length and the diameter of the branch introduction passage portions 11a and 11b are selected so that the introduction-passage-related tuned engine speed is lower than the intake-passage-related tuned engine speed.

Generally, the minimum value of the diameter d of the branch introduction passage portions 11a and 11b is limited by the amount of the fluid to be fed therethrough, and accordingly the average length of the branch introduction passage portions 11a and 11b is made relatively long to meet the above condition.

The embodiment shown in FIG. 1 is advantageous in that flows of the bypass air, the blowby gas and the fuel vapor are each controlled by a single control means, and therefore control of the flow of the fluid is facilitated.

In another embodiment shown in FIG. 4, an exhaust gas introduction passage 32 for introducing recirculation exhaust gas is provided in addition to the fluid introduction passage 11 for introducing the bypass air, the blowby gas and the fuel vapor. The exhaust gas introduction passage 32 comprises a pair of branch introduction passage portions 32a and 32b respectively connected to the first and second surge tanks 3 and 4 at one end, and a main introduction passage portion 32c connected to the other ends of the branch introduction passage portions 32a and 32b at its downstream end and to the second exhaust pipe 10 at its upstream end. The exhaust gas introduction passage 32 is provided with an EGR control valve 33 in the main introduction passage portion 32c upstream of the branch introduction passage portion 32a and 32b. Similarly to the fluid introduction passage 11, the diameter d' and the average length l' of the branch introduction passage portions 32a and 32b of the exhaust gas introduction passage 32 are selected to satisfy the condition $d'/\sqrt{l'}<D/\sqrt{L}$.

When a pair of fluid introduction passages are provided as in this embodiment, both the introduction passages should satisfy the condition described above, and the frequency properties determined by both introduction passages should be set to the lower engine speed side so as not to adversely affect the resonance supercharging effect of the overall intake system.

Though in the embodiments shown in FIGS. 1 and 4, the branch intake passage portions 5 and 6 are integrated into the main intake passage portion 7, they may be separately connected to air cleaners, for instance. In this case, the length between the air cleaner and the surge tank is considered to be the length of each branch intake passage portion.

Further, though the bypass air introduction passage 15, the blowby gas introduction passage 16 and the fuel vapor introduction passage 17 are all integrated to a single fluid introduction passage 11 in order to simplify piping in the embodiments shown in FIGS. 1 and 4, the introduction passages 15 to 17 may be separately connected to the surge tanks 3 and 4. In such a case, each of the introduction passages should satisfy the condition described above as in the case of the fluid introduction passage 11 and the exhaust gas introduction passage 32 in the second embodiment.

The present invention can be applied also to a V-type engine. Generally, in the V-type engines, intake timings of the cylinders in each cylinder bank are not immediately successive. Accordingly, the discrete intake passage portions in each bank may be concentrated into a concentrated portion, and the concentrated portions of the discrete intake passage portions in both cylinder banks may be connected to a main intake passage portion by way of branch intake passage portions.

What is claimed is:

1. An intake system for a multicylinder engine in which discrete intake passage portions immediately connected to the respective cylinders are divided into two groups so that intake timings of the discrete intake passage portions in each group are not immediately successive, and the discrete intake passage portions in each group are concentrated to form a concentrated portion, branch intake passage portions extending upstream from the concentrated portions for the both groups and being integrated with each other to form a main intake passage portion, wherein the improvement comprises a fluid introduction passage for introducing at least one desired fluid into the cylinders, the fluid introduction passage comprising a main introduction passage portion connected to a source of the desired fluid at its upstream end portion and a pair of branch introduction passage portions connected to the respective branch intake passage portions or concentrated portions at their downstream ends and to the downstream end of the main introduction passage portion at their upstream ends, the fluid introduction passage being provided with a flow control valve means for controlling the flow of the fluid passing therethrough at a portion upstream of the junction of the branch introduction passage portions to the main introduction passage portion, the diameter and the average length of the branch introduction passage portions satisfying the condition $d/\sqrt{l} < D/\sqrt{L}$ so that the air column in the branch introduction passage portions resonates at a lower frequency than the air column vibration system in the intake passage upstream of the concentrated portions wherein D and d respectively represent the diameters of the branch intake passage portions and the branch introduction passage portions, and L and l respectively represent the average lengths of the branch intake passage portions and the branch introduction passage portions.

2. An intake system as defined in claim 1 in which the intake strokes of the cylinders connected to the discrete intake passage portions in each group do not essentially overlap each other.

3. An intake system as defined in claim 2 in which said multicylinder engine has six cylinders.

4. An intake system as defined in claim 1 in which said multicylinder engine is a gasoline-fueled engine and each of said branch introduction passage portions is connected to the corresponding concentrated portion or a part of the corresponding branch intake passage portion downstream of a throttle valve.

5. An intake system as defined in claim 4 in which each of said branch intake passage portions is provided with a throttle valve.

6. An intake system as defined in claim 1 in which said main introduction passage portion of the fluid introduction passage is connected to a plurality of fluid sources.

7. An intake system as defined in claim 6 in which said multicylinder engine is a gasoline-fueled engine and each of said branch introduction passage portions is connected to the corresponding concentrated portion or a part of the corresponding branch intake passage portion downstream of a throttle valve.

8. An intake system as defined in claim 7 in which said plurality of fluid sources includes at least two of bypass air for adjusting the engine rpm during idling, blowby gas and fuel vapor trapped in a canister.

9. An intake system as defined in claim 1 in which said pair of branch introduction passage portions are substantially equal to each other in length.

10. An intake system as defined in claim 5 further comprising additional fluid introduction passages each of which comprises a main introduction passage portion connected to a source of the desired fluid at its upstream end portion and a pair of branch introduction passage portions connected to the respective branch intake passage portions or concentrated portions at their downstream ends and to the downstream end of the main introduction passage portion at their upstream ends, each additional fluid introduction passage being provided with a flow control valve means for controlling the flow of the fluid passing therethrough at a portion upstream of the junction of the branch introduction passage portions to the main introduction passage portion, the diameter and the average length of the branch introduction passage portions satisfying the condition $d/\sqrt{l} < D/\sqrt{L}$ so that the air column in the branch introduction passage portions resonates at a lower frequency than the air column vibration system in the intake passage upstream of the concentrated portions wherein D and d respectively represent the diameters of the branch intake passage portions and the branch introduction passage portions, and L and l respectively represent the average lengths of the branch intake passage portions and the branch introduction passage portions.

11. An intake system as defined in claim 10 in which one of the fluid introductions passages is for introducing recirculation exhaust gas.

12. An intake system as defined in claim 10 in which one of the fluid introduction passages is for introducing bypass air for adjusting the engine rpm during idling.

13. An intake system as defined in claim 10 in which one of the fluid introduction passages is for introducing blowby gas.

14. An intake system as defined in claim 10 in which one of the fluid introduction passages is for introducing fuel vapor trapped by a canister.

15. An intake system as defined in claim 10 in which the intake strokes of the cylinders connected to the discrete intake passage portions in each group do not essentially overlap each other.

16. An intake system as defined in claim 10 in which said multicylinder engine has six cylinders.

17. An intake system as defined in claim 10 in which said pair of branch introduction passage portions are substantially equal to each other in length.

* * * * *